2,884,301

CONDENSATION PRODUCTS, THERMOSET RESINOUS MATERIALS, TREATED FABRICS, AND METHODS FOR PRODUCTION OF SUCH PRODUCTS

Warren L. Beaumont and Egbert E. House, Jr., Salisbury, N.C., assignors to Proctor Chemical Company, Inc., Salisbury, N.C., a corporation of North Carolina No Drawing. Application May 15, 1958
Serial No. 735,350

12 Claims. (Cl. 8—116.2)

This invention relates to new improvements in condensation products, thermoset resinous materials, treated fabrics, and methods for production of such products, and for the formation of such treated fabrics. More particularly, the invention is concerned with (a) new reaction products formed by the condensation of certain heterocyclic compounds with aldehydes, (b) thermoset resinous material formed from such products, (c) wrinkle-resistant textile fabrics treated with such condensation products, (d) methods for the production of the condensation products and the resinous materials, and (e) methods for the treatment of fabrics.

FIELD OF INVENTION

Aminoplasts are a well known class of chemical substances which are used for a wide variety of purposes. Historically, the early products of this type were made from urea or thiourea and formaldehyde or other aldehydes. The reaction products were used for molding plastic articles, in adhesives and in paints and lacquers. Later they were used to treat textiles to render the fabrics wrinkle-resistant and produce other effects therein. These early products were inexpensive and relatively easy to make, but they possessed many deficiencies. For example, molded articles made therefrom had a great tendency to craze when subjected to sunlight or weathering conditions. Similarly, the textile treating resins derived from urea or similar acyclic compounds have proved useless for treating cotton textiles or similar materials which are to be subjected to washing and bleaching operations because fabrics containing such resinous materials retain chlorine which is released during the bleaching operation. Hence, when fabrics with such retained chlorine are subsequently subjected to high temperatures which may be encountered in ironing or in automatic dryers, hydrochloric acid is released which causes severe damage to the fabric, e.g., loss in tensile strength as high as 90%.

The various problems connected with aminoplasts derived from urea and related acyclic compounds motivated a great deal of research directed at the development of aminoplasts having improved properties for the ultimate end usage of the products. This led to the development of improved aminoplasts formed by the condensation of aldehydes with heterocyclic compounds. For example, textile treating resins of reduced chlorine retention properties are now produced from formaldehyde and cyclic ureas, e.g., N,N' ethylene urea. Such materials and the treatment of textiles therewith are mentioned in various U.S. patents including 2,121,697; 2,339,203; 2,416,884; 2,731,364 and 2,764,573.

When textiles treated with such heterocyclic compound containing products, e.g., dimethylol ethylene urea, are washed with a chlorine bleach present and are subsequently ironed dry, there is, at first, little or no loss in tensile strength caused by retained chlorine. However, as the fabric is washed again and again in the presence of a chlorine bleach, loss in tensile strength caused by retained chlorine increases with each wash until the fabric is unfit for wear. The degree of damage caused by chlorine washes is dependent on the number and severity of the washes and is thought to be related to the gradual hydrolysis of the ethylene urea resin. In other words, although great strides have been made in developing improved aminoplasts for various uses, including textile treatments, still further improvements are needed in such products.

The improvement of aminoplasts involves not only an elimination of existing defects in prior known materials, but also attention to other factors which are required if commercially attractive, improved products are to be provided. For example, not only is it necessary for textile treating resins used to impart crease-resistance and dimensional stability to textile fabrics to be free of the indicated chlorine retention aspects, but these products must also meet other basic requirements if they are to prove commercially useful for the production of treated textiles. Thus, textile treating agents must be sufficiently stable so that they can be stored and handled over extended periods of time under various conditions. Moreover, they must be formed from ingredients which can be obtained at relatively low cost, so that the textile resins can be made available and used without greatly increasing the cost of the treated textiles and the resulting finished garments. Likewise, the textile resins cannot adversely affect the color, handle and other properties of the fabrics, and they must be capable of being used in standard textile treating machinery and procedures, because if they require use of specially trained personnel or unusual equipment, they will not generally be accepted by the textile industry.

OBJECTS

A principal object of this invention is the provision of new improvements in (a) condensation products, (b) aminoplasts, (c) fabrics treated therewith to impart wrinkle-resistance and other permanent effects to the fabrics, and (d) methods for the production of the condensation products and the aminoplasts and (e) methods for the treatment of fabrics.

Further objects include:

(1) The provision of new and novel textile resins which may be used to produce permanent wrinkle-resistance and other permanent effects in cotton or other textile fabrics without creating deleterious chlorine retention properties therein, with the wrinkle-resistance and other imparted effects being retained even after repeated washings involving severe conditions that have degraded or deteriorated even the best of the non-chlorine retentive textile resins known heretofore;

(2) The provision of new textile treating agents which are water soluble and which may be applied in amounts of about 1 to 5% active solids with standard textile treating methods to produce permanent wrinkle-resistance and other permanent effects in cotton and other textile fabrics;

(3) The provision of such textile treating agents which possess relatively good storage qualities, which are suitable for application to white or colored textiles because they do not discolor the fabric, which do not have objectionable odors, and do not create odors at any time in the materials treated therewith, and which leave textiles after treatment with desirable body, feel, handle and other characteristics possessed by the textile prior to treatment and essential to a satisfactory treated fabric;

(4) The provision of new aminoplasts derived from heterocyclic nitrogen containing compounds and aldehydes;

(5) The provision of new methods for producing permanent wrinkle-resistance and other permanent effects in cotton textile fabrics, without imparting deleterious chlorine retention properties thereto;

(6) The provision of new textiles having unique and improved properties.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

GENERAL DESCRIPTION

These objects are accomplished according to the present invention by the formation of condensation products between aldehydes and heterocyclic compounds having the following structural formula:

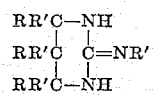

wherein R represents radicals selected from the group consisting of hydrogen, hydroxyl, alkyl, alkoxy, aryl and aryloxy, and R' represents radicals selected from the group consisting of hydrogen, alkyl and aryl.

The most important and useful condensation products are formed from the heterocyclic compounds in which the radicals R' are all hydrogen and the radicals R are hydrogen, hydroxyl, one to three carbon alkyl or one to three carbon alkoxy.

These compounds can be named as derivatives of tetrahydro-2(1H)-iminopyridine or, alternatively, as derivatives of 1,3-propylene guanidine. For example, the following compound:

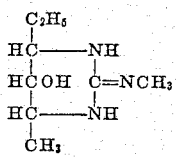

can be designated as 4-methyl-5-hydroxy-6-ethyl-tetrahydro-2(1H)-methyliminopyrimidine or, alternatively, as N,N'(1 - methyl - 2 - hydroxy - 3 - ethyl - 1,3 - propylene)-N"-methyl guanidine.

The resulting condensation products are alkylol or arylol derivatives of the heterocyclic compounds.

The condensation is carried out in an aqueous medium at a pH of about 8 to 11, preferably 9.5 to 10.5, using between about 1 to 4 mols of the aldehyde per mol of heterocyclic compound.

The resulting derivatives may be condensed to form aminoplasts or they may first be reacted with alcohols to form corresponding ethers. Accordingly, the reaction products formed between aldehydes and the heterocyclic compounds, and if desired, by further reaction with alcohols, which may be employed to form thermoset resinous products, will have the following structure:

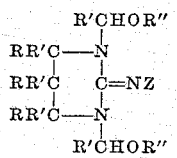

wherein R" represents radicals selected from the group consisting of —H and $C_1$ to $C_3$ alkyl, Z represents radicals selected from the group consisting of —R' and —CR'OR", and R and R' have the meaning defined above.

In the structural formulae given above, the radicals R, R' and R" may be the same or different radicals in a single compound.

These low molecular weight condensation products may be converted to high molecular weight aminoplasts by further condensation with themselves or in admixture with other aminoplast-forming nitrogen containing compounds, in the presence of acidic aminoplast-forming catalysts, e.g., acid salts of metals, ammonia and amines.

For the treatment of fabrics to impart crease-resistance and other permanent effects thereto, condensation products which are water-soluble to an extent of at least 10 grams per 100 grams of water at 20° C. should be employed, e.g., condensation products formed between formaldehyde and heterocyclic compounds as defined above, in which the radicals R' are all hydrogen, at least two of the radicals R are hydrogen, and the other radical R is hydrogen, hydroxyl, $C_1$ to $C_3$ alkyl or $C_1$ to $C_3$ alkoxy.

In the treatment of textiles, water solutions of these preferred products are employed and further polymerization is effected to form aminoplasts thereof, either on the surface or within the interior of fibers, both natural and synthetic, to form permanent wrinkle-resistance and other permanent effects in the fibers and fabrics made therefrom. When this further condensation in the presence of fibers is carried out using cotton fibers or other high molecular weight polyhydroxy containing polymer fibers, the resulting condensation products appear to chemically include condensation products with the polymer fibers.

Success of the present invention is due to a large extent to the discovery that the new aminoplasts and, consequently, the textiles treated therewith, possess a critically improved resistance to deterioration under severe hydrolyzing conditions such as are encountered in strenuous textile washing and bleaching operations, as compared to the resistance of aminoplasts formed from ethylene urea and other heterocyclic ureas employed heretofore for the formation of textile treating resins. Accordingly, the provision of these new condensation products makes possible the formation of crease and wrinkle-resistant fabrics which possess an improved combination of a high degree of resistance to degradation under severe hydrolyzing conditions and a low degree of chlorine retention as compared to other fabric treating resins known heretofore.

EXAMPLES

A more complete understanding of the new compositions, products and processes encompassed by this invention may be had by reference to the following examples, which describe the best mode for carrying out the invention. All parts in the examples are by weight unless otherwise specified.

Example I

Into a suitable reaction vessel equipped with stirring means, there are charged 100 parts of tetrahydro-2(1H)-iminopyrimidine, 250 parts of 37% formaldehyde solution, and 50 parts of water with gentle mixing and the pH of the mix is raised to 10.0–10.5 by the addition of dilute NaOH solution. Heat is applied and the temperature of the mix is raised in about ten minutes to 60° C. This temperature is maintained for one hour, whereupon the mix is neutralized to a pH of 7.2–7.5 with hydrochloric acid, the solution being continually stirred throughout. The resultant product is an aqueous solution of the polymethylol derivative of tetrahydro-2(1H)-iminopyrimidine.

One hundred parts of the resultant solution are mixed with 7.5 parts of commercial zinc nitrate crystals and this mixture is diluted to a total of total of 1000 parts with water. The resulting solution is padded on a broadcloth shirting fabric of 136 warp x 60 filling construction to give a wet pickup of approximately 70%. The fabric is then dried at ambient temperature (about 20° C.) and subsequently cured in an oven for five minutes at 160° C.

In another case, 100 parts of an aqueous solution containing 50% dimethylol ethylene urea and 7.5 parts of commercial zinc nitrate crystals brought to a total of 1000 parts with water is similarly padded on another length of the same broadcloth shirting material. This material is then dried at ambient temperature and cured at 160° C. for five minutes.

The resulting treated broadcloth materials are examined for chlorine-retention and tensile loss properties using the test methods specified in Federal Specification CCC–T–1916 and the AATCC scorch test method. The results of these tests show that although the tensile strengths of the two separate treated fabrics are approximately the same before washing and after one washing in presence of chlorine bleach, the dimethylol ethylene urea treated fabric exhibits a critically greater percentage loss in tensile strength due to chlorine retention after five washes.

*Example II*

Two hundred parts of the resultant solution of Example I are subjected to vacuum distillation to remove the water. There is obtained about 100 parts of a yellow, solid brittle material which is soluble in ethanol and acetone.

The 100 parts of resulting solid material is pulverized and then mixed with 100 parts of wood flour, 5 parts of hexamethylene tetramine and 5 parts of diammonium acid phosphate. The mixture was charged into a disc mold and molded at 120 p.s.i. and 150° C. for fifteen minutes. A hard, molded disc is obtained which possesses a shiny surface and good impact strength.

*Example III*

115 parts of tetrahydro-5-hydroxy-2(1H)-iminopyrimidine, 250 parts of commercial formalin and 50 parts of water are charged into a stirrer-equipped reaction vessel. While the mixture is gently stirred, dilute NaOH solution is added until its pH is raised to 10.5. Heat is then applied to raise the temaperature of the mix to 60° C. and the mix is maintained at that temperature for one hour while stirring is continued. Then the mix is neutralized to a pH of 7 by the addition of hydrochloric acid.

One hundred parts of the resultant solution of polymethylol iminopyrimidine derivative are mixed with 7.5 parts of zinc nitrate and this mix is diluted to a total of 1000 parts with water.

This mixture is padded on a lightweight print cloth of approximately 80 warp x 80 filling construction to give a wet pickup of about 70%. The fabric is then ironed dry and cured for five minutes at 160° C.

A second treating solution is prepared containing:

| | Parts |
|---|---|
| 50% dimethylol ethylene urea | 10.00 |
| Zinc nitrate crystals | .75 |
| Water | 89.25 |
| Total | 100.00 |

A piece of the same print cloth is similarly padded on with this second solution, dried and cured as above. The resulting two separate treated fabrics are then tested in the same manner as the fabrics of sample I with similar results.

DISCUSSION OF DETAILS

Formaldehyde is the preferred aldehyde for reaction, according to the present invention, with the heterocyclic nitrogen containing compounds. Commercial formalin, which contains about 37% active formaldehyde, is a good source of HCHO for use in conducting the condensation reactions, but other sources and formaldehyde donors may be used, i.g., paraformaldehyde, hexamethylene tetramine or the like. Other aldehydes which may be used to form condensation products with these heterocyclic compounds include acetaldehyde, propionaldehyde, acrolein, methacrolein, furfural, cyclohexyl aldehyde, benzaldehyde, cinnaldehyde, and the like, and mixtures thereof. These aldehydes are best used to form thermo-setting resins which may be included in molding compositions, lacquers and the like, while the formaldehyde containing reaction products are recommended for use as the textile treating materials.

The heterocyclic reactants useful in the reactions of this invention have been defined above by structural formula. Since they are varied as well as the aldehyde reactants, a wide variety of initial condensation products can be formed. Examples of specific products which can be produced, in addition to those already given, include trimethylol tetrahydro-4-methyl-2(1H)-iminopyrimidine, diethylol tetrahydro-5-ethoxy-2(1H)-methyliminopyrimidine, difurylol tetrahydro - 6 - phenyl - 2(1H) - methyl-iminopyrimidine, methylol phenylol tetrahydro-4-phenoxy-2(1H)-phenyliminopyrimidine, and dibenzylol tetrahydro-5-isopropyl-2(1H)-methyliminopyrimidine.

The amount of aldehyde used for reaction with the heterocyclic compounds may be varied from less than about 1 mol to about 5 mols per mol of the heterocyclic compound, but, preferably, about 1 to 3 mols of aldehyde for each mol of the heterocyclic compound is employed. For making the low molecular weight, water soluble condensation products which are used as textile treating agents by reaction of formaldehyde with a heterocyclic compound, between about 1.5 and 2.5 mols of formaldehyde are used for each mol of the heterocyclic compound. When less than 2 mols of aldehyde per mol of heterocyclic compound is used, the monoalkylol or a mixture of the mono- and dialkylol derivative is obtained. Solutions of such mono- and di- mixtures, e.g., with an average of 1.2 to 1.6 methylol groups, are particularly useful as commercial products since they have very excellent shelf life and do not form crystal deposits on standing at room temperature.

The initial condensation reaction is carried out at a temperature between about 30 and 100° C., preferably 50 to 70° C., in an aqueous medium having a pH between about 8 to 11, and preferably between about 9.5 and 10.5. Since commercial formalin contains formic acid in small amounts, and most other aldehydes also contain small percentages of acidic materials, the pH of the reaction medium should be adjusted to the required alkaline conditions by addition of small amounts of sodium or other alkali metal hydroxides or carbonates, ammonia hydroxide, magnesium carbonate or other suitable alkaline or buffer materials.

The condensation reaction is conducted under the conditions specified for sufficient time to permit substantial reaction to occur, less time being required the higher the temperature, e.g., when formaldehyde is used in the preferred range of 50 to 70° C., the reaction time will be between about 15 and 120 minutes. With the other temperatures, correspondingly longer or shorter reaction times can be employed. After the substantial condensation reaction has been allowed to take place, the pH of the solution is adjusted to between about 7.0 and 7.5 by the addition of a mineral acid such as hydrochloric acid or other suitable acidic or buffering material.

As previously indicated, the resulting alkylol or arylol derivatives of the heterocyclic compounds may be reacted with alcohols to form the corresponding ethers. Alcohols suitable for the process are water-soluble saturated and unsaturated alcohols, and include monohydric alcohols, e.g., methanol, ethanol, propanol, allyl alcohol, and polyhydric alcohol, e.g., ethylene, glycol, propylene glycol, glycerol and the like. Mixtures of alcohols may be used to give products having mixed alkyl substitutions.

The alcohol modification of the condensation products can be accomplished simultaneously with the reaction between the aldehyde and the heterocyclic compound, but alcohol modification is better obtained by carrying out the initial condensation between the aldehyde and the heterocyclic compound under the conditions specified above, then adding the alcohol thereafter, along with sufficient acid to bring the pH of the reaction mixture below 7, preferably about 4 to 6, and condensing the alcohol with the preformed reaction product at an elevated temperature between about 50 and 100° C. The maximum amount of alcohol which can be made to react is 2 mols for each mol of initial heterocyclic compound, but less than this may be employed, e.g., 0.5 to 2 mols of alcohol per mol of heterocyclic compound.

The alkylol products or the corresponding alcohol-modified materials are caused to condense further to form high molecular weight thermoset aminoplasts by reaction at temperatures between about 80 and 200° C. in the presence of acidic, aminoplast-forming catalysts. Examples of suitable catalysts include free acids, e.g., hydrochloric, citric, phthalic and tartaric acids, acid-reacting metal salts, e.g., zinc chloride, zinc nitrate, zinc fluoroborate, magnesium chloride, and acid-reacting salts of ammonia or amines, e.g., ammonium silico fluoride, diammonium acid phosphate, monoethanolamine hydrochloride and the like. Usually 1 to 10% by weight of the catalyst based upon the weight of the initial condensation product is an effective amount.

It is possible to include other aminoplast-forming substances in the condensation reactions, i.e., to replace part of the stated heterocyclic compounds with other aminoplast-forming substances, e.g., ethylene urea, melamine, 1,3-propylene urea, thiourea, urea, cyanamide, urethanes, and the like. Modified condensation products and cured aminoplasts can be obtained in this fashion.

Various additives may be included in the mixtures used to form new resinous materials, or the textile treating solutions prepared from the new condensation products. This includes such conventional additives as softeners, lubricants, water repellants, fillers, dyes, pigments, and the like.

The formation of permanently crease-resistant fabrics is one of the most important uses of new water-soluble condensation products of this invention. In order to produce the crease-resistant fabrics, it is preferable to use aqueous solutions of the new reaction products in such state of condensation that they are water-soluble, i.e., capable of being dissolved in water to form solutions of at least 10% concentration. To effect the treatment of textile materials with such aqueous solutions, the textile material is impregnated with a solution containing the condensation products and an aminoplast-forming catalyst as described above. The impregnated fabric is dried at a temperature of, for example, 50 to 150° C., and then is heated to convert the active resin-forming material into a thermoset resinous product, preferably at a temperature of about 100 to 200° C. for about 1 to 15 minutes. Drying and curing can take place at the same temperature and in the same oven or drier, if desired.

No special equipment or unusual procedural methods are required for treating textiles with the new crease-resistant imparting products of this invention. Thus, established padding or impregnation procedures may be used and these may be carried out in standard textile processing equipment. Likewise, the drying and curing may be carried out on standard textile handling apparatus. Furthermore, these textile treating agents may be applied in conjunction with other textile processing operations such as waterproofing, calendering, embossing, pressing and the like. Other known finishing agents such as sizing materials, lubricating materials, waterproofing agents and the like may be applied to the fabrics in these finishing operations.

Since the new condensation products can also serve as fixing agents for dyestuffs, treatment of the fabrics as described can be used in conjunction with established dyeing or coloring operations.

Having provided a complete description of the invention in such manner as to distinguish it from other inventions and from what is old, and having provided a decription of the best mode contemplated of carrying out the invention, that which is claimed is:

1. Condensation products having the following structure:

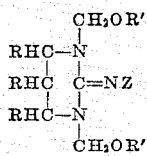

wherein R represents radicals selected from the group consisting of —H, —OH, $C_1$ to $C_3$ alkyl and $C_1$ to $C_3$ alkoxy, R' is a radical selected from the group consisting of —H and $C_1$ to $C_3$ alkyl, and Z is a radical selected from the group consisting of —R' and —$CH_2OR'$.

2. A resinous product formed by the polymerization of a condensation product defined in claim 1 in the presence of an acidic aminoplast-forming catalyst.

3. A resin-forming composition comprising an aqueous solution of an acidic aminoplast-forming catalyst and a resin forming material selected from the group consisting of condensation products as defined in claim 1, water-soluble polymers thereof, and mixtures of said products and said polymers.

4. A method for producing permanent wrinkle-resistance in cotton textile fabrics without imparting deleterious chlorine retention properties thereto which comprises impregnating a cotton textile fabric with an aqueous solution comprising a condensation product as defined in claim 2 and an acidic aminoplast-forming catalyst and thereafter heating the impregnated fabric to dry the fabric and convert the resin-forming impregnant into a thermoset product.

5. A method for producing permanent wrinkle-resistance in cotton textile fabrics without imparting deleterious chlorine retention properties thereto which comprises impregnating a cotton textile fabric with an aqueous solution comprising a water-soluble condensation product of tetrahydro-2(1H)-imino-pyrimidine and formaldehyde as defined in claim 1 and an acidic aminoplast-forming catalyst, drying the impregnated fabric and heating the dried fabric to convert the resin-forming impregnant into a thermoset product.

6. A wrinkle-resistant web comprising the condensation product formed between (1) a water-soluble reaction product of formaldehyde and tetrahydro-2(1H)-imino pyrimidine as defined in claim 1 and (2) cellulosic fibers contained in said web in the presence of an acidic aminoplast-forming catalyst.

7. A wrinkle-resistant web comprising the condensation product formed between (1) cotton fibers and (2) a condensation product as defined in claim 1 in the presence of an acidic aminoplast-forming catalyst.

8. A wrinkle-resistant cotton textile fabric which is substantially free of deleterious chlorine retention properties comprising a cured condensation product of tetrahydro-2(1H)-imino-pyrimidine and formaldehyde as defined in claim 1.

9. A wrinkle-resistant cotton textile fabric which is substantially free of deleterious chlorine retention properties comprising a cured resinous material formed of a condensation product as defined in claim 1.

10. A process for preparing condensation products which comprises mixing together a heterocyclic compound having the following structure:

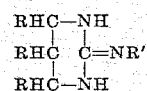

wherein R is a radical selected from the group consisting of —H, —OH, $C_1$ to $C_3$ alkyl and $C_1$ to $C_3$ alkoxy and R' is a radical selected from the group consisting of —H and $C_1$ to $C_3$ alkyl, an aldehyde selected from the group consisting of $C_1$ to $C_4$ aliphatic aldehydes and monocyclic aromatic aldehydes, and an inorganic base in the proportions of about 1 to 3 mols of aldehyde for each mol of said heterocyclic compound and sufficient of said base to give the mixture a pH of between about 8 and 11, heating the resulting mixture to a temperature between about 30° and 100° C. until substantial reaction occurs between said compound and said aldehyde and then adjusting the pH of the mixture to between about 7.0 and 7.5.

11. A process for preparing a resin-forming product which comprises mixing together about 1 mol of tetrahydro-2(1H)-imino-pyrimidine with between about 1.5 to 2.5 mols of formaldehyde in an aqueous medium, adjusting the pH of the mixture to between about 9.5 and 10.5, heating the mixture to between about 50° and 70° C. for between about 15 to 120 minutes and then adjusting the pH of the solution to between about 7.0 and 7.5.

12. A composition which comprises a condensation product as defined in claim 1 and about 1 to 10% by weight of said derivative of an acidic aminoplast-forming catalyst.

No references cited.

UNITED STATES PATENT OFFICE
CERTIFICATE OF CORRECTION

Patent No. 2,884,301                                        April 28, 1959

Warren L. Beaumont et al.

It is hereby certified that error appears in the printed specification of the above numbered patent requiring correction and that the said Letters Patent should read as corrected below.

Column 5, line 69, for "i.g." read -- e.g. --; column 7, line 74, for "decription" read -- description --; column 8, line 29, for the claim reference numeral "2" read -- 1 --.

Signed and sealed this 18th day of August 1959.

(SEAL)
Attest:

KARL H. AXLINE                                      ROBERT C. WATSON
Attesting Officer                                  Commissioner of Patents